Oct. 27, 1925.

F. SMOLA 1,558,940

PROCESS FOR MAKING A FROZEN CONFECTION

Filed Aug. 9, 1923

INVENTOR.
Ferdinand Smola
BY
ATTORNEY.

Patented Oct. 27, 1925.

1,558,940

UNITED STATES PATENT OFFICE.

FERDINAND SMOLA, OF OMAHA, NEBRASKA.

PROCESS FOR MAKING A FROZEN CONFECTION.

Application filed August 9, 1923. Serial No. 656,568.

*To all whom it may concern:*

Be it known that I, FERDINAND SMOLA, a citizen of Czechoslovakia, residing at 839 Pine Street, Omaha, county of Douglas, State of Nebraska, have invented a new and useful Process for Making a Frozen Confection While Keeping it Firm in Containers or Molds, of which the following is a specification.

This invention relates to improvements in processes of keeping ice cream frozen firm in containers while baking a covering or closure for the containers prepared from a dough of whites and yolks of eggs mixed together with a quantity of sugar and beaten to a proper consistency which dough is poured in a moderate quantity into the containers previously filled with ice cream. The containers are conveniently produced as wafer baskets. The dough thus poured in will form, after being exposed to heat, a thin crust on the top of the ice cream, giving it a pastry taste and appearance.

Figures 1, 2:
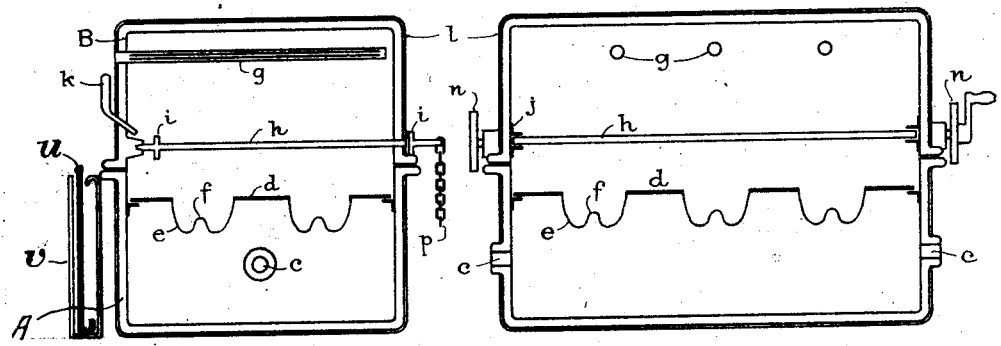
Figures 3, 4, 6:
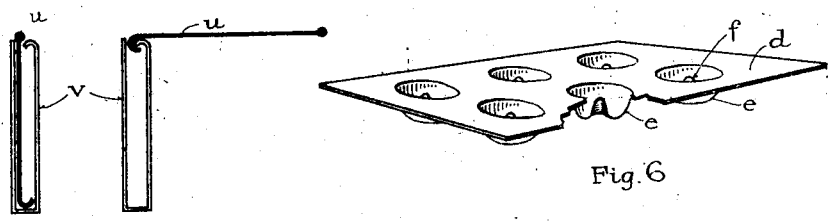
Figure 5:
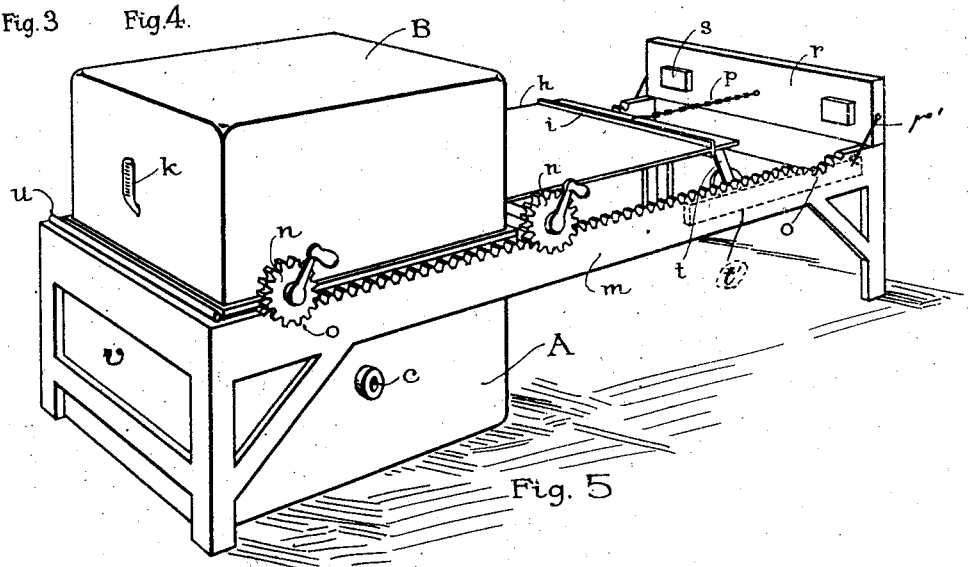
Figure 7:
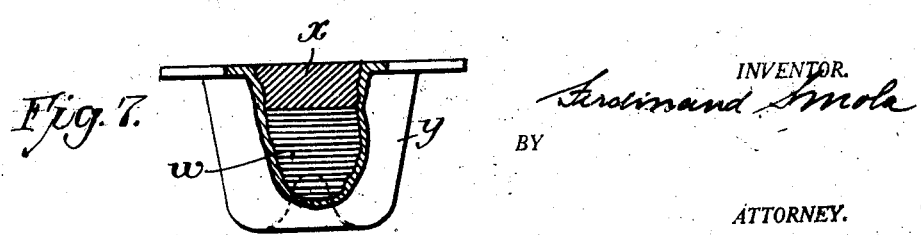

In the accompanying drawing forming a part of this specification and in which like numerals are employed to designate like parts throughout the same, Figure 1 is a longitudinal sectional view of the two-part chamber embodying this invention, Figure 2 is a transverse sectional view of the structure illustrated in Fig. 1, Figure 3 is a detail end elevational view of the cover plate and guide for the cold bath with the cover plate housed within said guide, Figure 4 is a detail end elevational view of the structure illustrated in Fig. 3 with the cover plate removed from the guide and positioned for covering the top of the cold bath, Figure 5 is a perspective view of the entire apparatus embodying this invention, Figure 6 is a detail perspective view of a pan employed for holding the ingredients during the entire operation of making the baked ice cream product embodying this invention, and Figure 7 is an enlarged view, partly in elevation and partly broken away, of the type of frozen confection produced by this process.

The making of the frozen confection described above necessitates the construction of an apparatus for this purpose. This apparatus is constructed in two parts. The lower part (A) is a cold bath containing the freezing temperature, the upper part is a bake oven (B). The cold bath (A) is constructed in the form of a vessel into which the freezing temperature is introduced and exhausted by way of openings (c). The cold bath is closed below the top edge by means of a removable pan (d) provided with cooling pockets (e), that have depressions (f) in the bottom in order to allow an increased freezing surface (see Fig. 6). Into these pockets the wafer baskets are placed to fit snugly. The pan (d) might be covered with a sheet of insulating material such as asbestos. The walls of the cooling pockets are of thin construction to effect immediate freezing. It will be apparent that by forming the walls of the cooling pockets —e— of thin material and the pan —d— of thick material, as illustrated in Figs. 1, 2 and 6, or with a covering of heat insulating material, as suggested above, the possibility of materially melting the ice cream in the wafer basket containers before the dough covering is baked, is greatly minimized. The upper part forming the bake oven (B) is provided with either electric or gas heaters (g) which are constructed of good fireproof material. The oven is closed by means of an oven door (h) provided with packing edges (i) on both sides in order to close the oven tightly. The oven-door moves in slides (j). For the purpose of measuring inside temperatures, a thermometer (k) is inserted in the front wall. Both the cold bath and the bake oven must be provided with an insulating covering (l) on the outside.

The cold bath is permanently attached to a stand while the bake oven is movable along the stand by means of cog tracks (m) and cog wheels (n). The cog tracks are provided at their outer ends with sinking grooves (o) to facilitate the raising and lowering of the bake oven.

The oven door —h— has been described as being movable in the slide grooves —j— carried by the bake oven B. The movement of the said oven from the position over the cold bath A toward the opposite end of the stand will tend to cause the door —h—, which is supported at its outer end by the supports —t— resting upon the members —t'—, to move into the oven. However, the door, if moved with the oven, will engage the bumpers —s— carried by the stop board —r— and will be held against movement, causing the oven wall to be moved into engagement with the packing edges —i— of the door. Upon moving the oven B toward its first mentioned position, or toward the cold bath A, the door —h— will be permitted to move with the oven until the chain —p— is taut, whereupon the movement of the door with the oven will cease and the latter will move until the remaining packing edge —i— is flushly engaging the inner face of the oven wall.

It will be noticed, by inspecting Fig. 5, that the hinged stop board —r— is held in its perpendicular position by the hooks and eyes —r'—. After disconnecting the hooks from the eyes, while the oven B is at the end of the stand removed from the cold bath A, the board may be swung downwardly to depend below the top of the stand, thereby permitting the door —h— to be pulled outwardly to allow for the cleaning of the interior of the bake oven B.

At the front end of the stand is a depending stationary plate guide —v— which houses the cover plate —u—. This cover plate is intended to be used to cover the upper end of the cold bath A when the bake oven B is removed therefrom.

The process of making a frozen confection has several phases. First, the wafer baskets Y are filled with ice cream W and then placed in the cooling pockets (a); second, the ice cream is then covered with dough X; third, the cold bath is then closed with the cover plate (u); and fourth, the ice cream is frozen for the time necessary to make it firm. The bake oven is in the meantime in the opposite end of the stand and being heated up. After the cover plate has been removed the heated bake oven is set over the cold bath and the dough covering the ice cream is exposed to heat for the time necessary to form the crust on the surface.

During the time of baking, the ice cream is maintained under freezing temperature in the cooling chamber. After the crust has been baked, the ice cream is still kept, for a short time, in the cooling chamber in order to again freeze the slightly melted portion near the baked crust.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. The process of making a frozen confection, consisting in enclosing ice cream ingredients in a baked container, subjecting the ingredients to a freezing temperature, placing a covering of dough over the frozen ice cream ingredients and within the opening in the container, and subjecting the dough to a baking temperature.

2. The process of making a frozen confection, consisting in enclosing ice cream ingredients in a baked container, subjecting the ingredients to a freezing temperature, placing a covering of dough over the frozen ice cream ingredients and within the opening in the container, and subjecting the dough to a baking temperature, while the frozen ice cream ingredients is still being subjected to a freezing temperature to maintain it firm.

3. The process of making a frozen confection, consisting in enclosing ice cream ingredients in a baked container, subjecting the ingredients to a freezing temperature, placing a covering of dough over the frozen ice cream ingredients and within the opening in the container, subjecting the dough to a baking temperature, while the frozen ice cream ingredients is still being subjected to a freezing temperature to maintain it firm, discontinue the subjecting of the dough covering to a baking temperature, and continue the subjecting of the ice cream ingredients to a freezing temperature to recover any softening that has occurred therein.

4. Apparatus of the type described comprising, a support, a freezing chamber carried thereby, a pan adapted to be removably positioned within said chamber, a cover for said chamber capable of being moved into operative and inoperative positions, and a baking oven adapted to be moved along said support for positioning it into and out of communication with said chamber.

5. Apparatus of the type described comprising, a support, a freezing chamber carried thereby, a pan adapted to be removably positioned within said chamber, said pan having a plurality of depending pockets formed of thinner material than the remainder of the pan for the reception of the substance to be treated, said depending pockets each being provided with an inwardly projecting depression, a cover for said chamber capable of being moved into operative and inoperative positions, and a baking oven adapted to be moved along said support for positioning it into and out of communication with said chamber.

6. Apparatus of the type described comprising a support, a freezing chamber carried thereby, a pan adapted to be removably positioned within said chamber, a cover for said chamber capable of being moved into operative and inoperative positions in respect to the latter, a baking oven adapted to be moved along said support for positioning it into and out of communication with said chamber, and a door automatically moved into and out of a position to close the bottom of the baking oven when the latter is moved along said support.

FERDINAND SMOLA.